(12) United States Patent
Maulik et al.

(10) Patent No.: US 7,394,857 B2
(45) Date of Patent: Jul. 1, 2008

(54) FLEXIBLE VERSATILE LOW-COST WIRELINE TRANSMIT DRIVER

(75) Inventors: Prabir C. Maulik, Lexington, MA (US); Paul M. Hendriks, Wakefield, MA (US); Iuri Mehr, North Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 615 days.

(21) Appl. No.: 10/698,976

(22) Filed: Oct. 31, 2003

(65) Prior Publication Data

US 2005/0094736 A1   May 5, 2005

(51) Int. Cl.
   *H04B 3/00*   (2006.01)
(52) U.S. Cl. .................. 375/257; 375/258; 375/222; 375/216; 375/357; 375/358; 327/65; 327/562; 327/63; 327/108; 327/560
(58) Field of Classification Search .................. 375/257, 375/258, 222, 357, 358, 216, 278, 279; 327/65, 327/562, 63, 108–112, 560–563
   See application file for complete search history.

(56) References Cited

U.S. PATENT DOCUMENTS

| | | | | |
|---|---|---|---|---|
| 4,943,784 A | * | 7/1990 | Rybicki ..................... | 330/264 |
| 5,493,205 A | * | 2/1996 | Gorecki ..................... | 323/315 |
| 5,608,348 A | * | 3/1997 | Kearney et al. ............. | 327/538 |
| 6,389,077 B1 | * | 5/2002 | Chan ......................... | 375/257 |
| 6,411,136 B1 | | 6/2002 | Nianxiong et al. | |
| 6,608,860 B1 | * | 8/2003 | Naviasky et al. ............ | 375/216 |
| 6,646,580 B2 | * | 11/2003 | Clara et al. .................. | 341/136 |
| 6,665,347 B2 | * | 12/2003 | van Bavel et al. ........... | 375/257 |
| 6,720,798 B2 | * | 4/2004 | Mulder et al. ................ | 327/65 |
| 6,741,195 B1 | * | 5/2004 | Cho ........................... | 341/136 |
| 6,937,971 B1 | * | 8/2005 | Smith et al. .................. | 703/18 |
| 7,031,378 B1 | * | 4/2006 | Muralt et al. ............... | 375/219 |
| 2002/0048109 A1 | * | 4/2002 | Chaiken et al. .............. | 360/67 |
| 2004/0005015 A1 | * | 1/2004 | Chan .......................... | 375/295 |
| 2004/0096005 A1 | * | 5/2004 | Zabroda ..................... | 375/257 |

FOREIGN PATENT DOCUMENTS

WO   WO 03/003607 A1   1/2003

OTHER PUBLICATIONS

EP 1 353 484 A2.*
IEEE Mark Summers "Low Voltage Line Driver Topologies for 10Base-T and 100Base-TX Ethernet" May 1999.
Bourret, S. et al., "Programmable High-Amplitude Balanced Stimulus Current-Source for Implantable Microstimulators," Proc. 19th International Conference, IEEE/EMBS, Oct. 30-Nov. 2, 1997, Chicago, IL, pp. 1938-1941.
Nairn, David G. et al., "Current-Mode Algorithmic Analog-to-Digital Converters," IEEE Jour. of Solid-State Circuits, vol. 25, No. 4, Aug. 1990, pp. 997-1004.

* cited by examiner

*Primary Examiner*—Chieh M. Fan
*Assistant Examiner*—Siu M Lee
(74) *Attorney, Agent, or Firm*—Wolf, Greenfield & Sacks, P.C.

(57) ABSTRACT

A versatile, programmable, low-cost transmit line driver is provided. The line driver includes a digital-to-analog converter that receives a digital input and provides an analog output. The line driver is reconfigurable between the voltage mode of operation.

15 Claims, 5 Drawing Sheets

US 7,394,857 B2

FLEXIBLE VERSATILE LOW-COST WIRELINE TRANSMIT DRIVER

BACKGROUND OF INVENTION

Field of Invention

The present invention relates to transmit line drivers and, more particularly, to a transmit line driver that is programmable and reconfigurable between current mode and voltage mode.

Transmit line drivers are well-known for providing analog voltages to a line, such as a cable line, a twisted pair or a power line, each for different applications. Known transmit drivers suffer from a number of drawbacks including high cost, low versatility and undesirable footprint on a circuit board.

The transmit section of a typical analog front end of a driver includes digital signal processing circuitry that provides a digital input to a digital-analog-converter (DAC). The DAC in turn provides an analog voltage as an output which could drive the line itself. In certain circumstances, an additional external component such as an operational amplifier is necessary to drive the line and is placed between the DAC and the line. High speed transmit DACs (e.g., those with sampling rates above 100 MHz) that drive the line directly typically are current output DACs. Current output DACs have high output impedance. In addition, the DAC output voltage has magnitude limits based on the DAC characteristics, such as the power supply of the DAC, for proper performance (e.g., low distortion) of the DAC.

FIG. 1 is a block diagram of a prior art driver. It includes DAC 2, analog filter 4, line driver amplifier 6 and transformer 8. $Z_{line}$ represents the impedance of the line. In operation, DAC 2 receives a digital input and provides an analog output to filter 4 which filters such output. Amplifier 6 amplifies the filtered analog output and provides the amplified output to transformer 8 which provides the analog voltage to driver the line to the line.

The characteristic impedance of lines can vary. For example, a cable has a stable and relatively constant impedance of approximately 75 ohms. A twisted pair, such as for use in a DSL application, is supposed to have an impedance of approximately 50 ohms, but is somewhat variable and depends, for example, on connect components used. A power line, such as that used in a power line application, has an impedance that varies significantly. Nominally, a power line has an impedance of approximately 50 ohms, but it can jump to approximately 2,000 ohms at times.

In circumstances, such as when the line is a power line, where the line impedance varies significantly and arbitrarily, then a current output DAC cannot drive the line directly, without suffering from significant performance degradation or incurring substantial inefficiencies. That is so because the DAC has high output impedance, as indicated. Thus, in a power line application, it is known to provide a voltage output line driver. For this, it is known to employ an external operational amplifier to translate the current output of the DAC to a voltage output. Such a solution, however, is a high cost solution.

SUMMARY OF INVENTION

The present invention is directed to a low-cost, versatile, programmable line driver that is configurable between current mode and voltage mode. In current mode, it operates in one of two current sub-modes.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
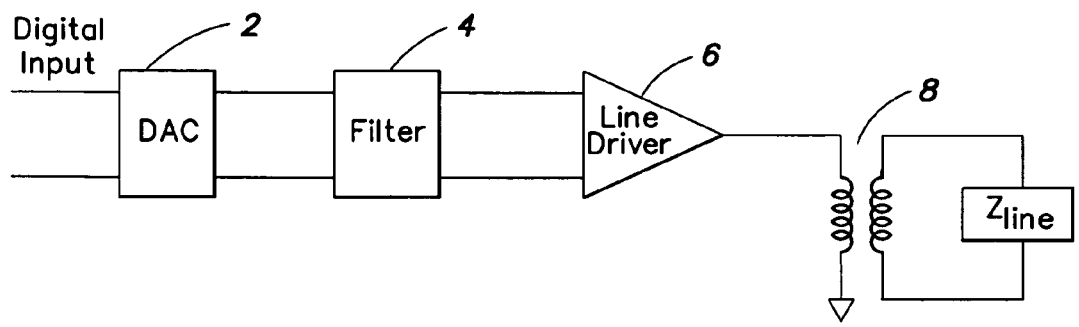
FIG. 1 is a block diagram of a prior art transmit driver.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

The present invention relates to a low-cost, versatile, programmable transmit driver that is capable of driving numerous different lines having different and varying impedances. Examples of such lines include a cable line, a twisted pair, such as for a DSL application, and a power line, for a power line application. A transmit driver is configurable between one of two current modes and a voltage mode of operation.

Figure 2:
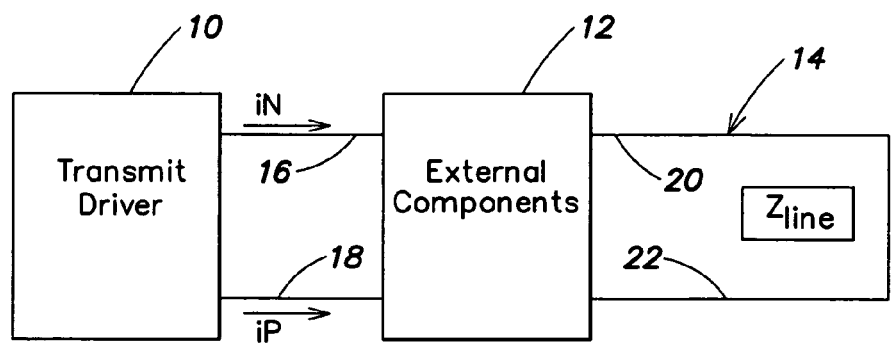
FIG. 2 is a partial block, partial schematic diagram of a transmit driver of the present invention.

FIG. 2 is a block diagram of an embodiment of the transmit driver of the present invention. Shown in FIG. 2 is a system including transmit driver 10 of the present invention, external components 12, and a line 14 including an impedance $Z_{line}$. Transmit driver 10 is shown throughout, including in FIG. 2, as being a differential transmit driver, but the invention is not so limited. It could alternatively be a single-ended transmit driver. As shown, transmit driver 10 provides two current outputs iN and iP (respectively representing negative current and positive current) which flow on lines 16 and 18 to external components block 12.

Block 12 may or may not exist depending on the mode of operation of the present invention. In other words, transmit driver 10 of the present invention may or may not require certain external components to be placed between it and line 14 which it drives. External components 12 in turn provide differential outputs along lines 20 and 22 to line 14.

Figure 3:
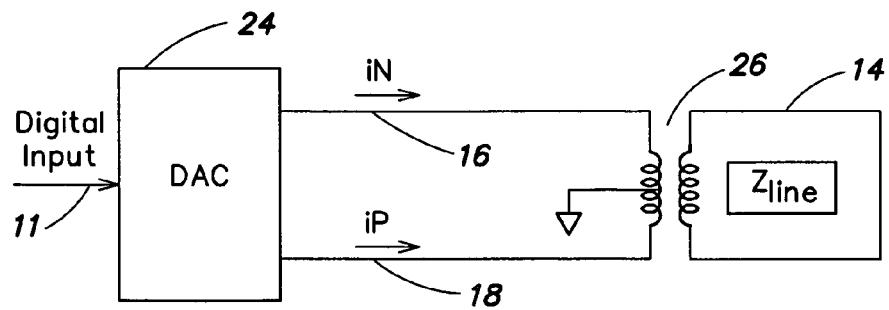
FIG. 3 is a more detailed partial block, partial schematic diagram of one embodiment of the transmit driver of the present invention.

A first embodiment of the invention is shown in more detail in the partial block, partial schematic diagram of FIG. 3. In this embodiment, transmit driver 10 includes DAC 24. DAC 24 receives a digital input on line 11 and provides differential current outputs iN and iP on lines 16 and 18, respectively. Such currents flow through transformer 26, shown connected to ground (but the invention is not so limited). As will be appreciated by those skilled in the art, the current iN and iP flowing through the primary windings of transformer 26 will induce a proportional current in the secondary windings of transformer 26 and provide the same current to line 14, having an impedance represented by $Z_{line}$.

In this embodiment of FIG. 3, DAC 24 is referred to as "driving the line directly." Such an embodiment provides the highest performance. This illustration shows one of the two current modes of operation of the transmit driver of the present invention. This is acceptable in applications where voltage swings are not too large and the impedance of the line is fairly stable and constant, such as in a cable modem application, or a twisted pair application. In these cases, the current output mode of operation in which the DAC drives the line directly, as shown in FIG. 3, is acceptable.

Figure 4:
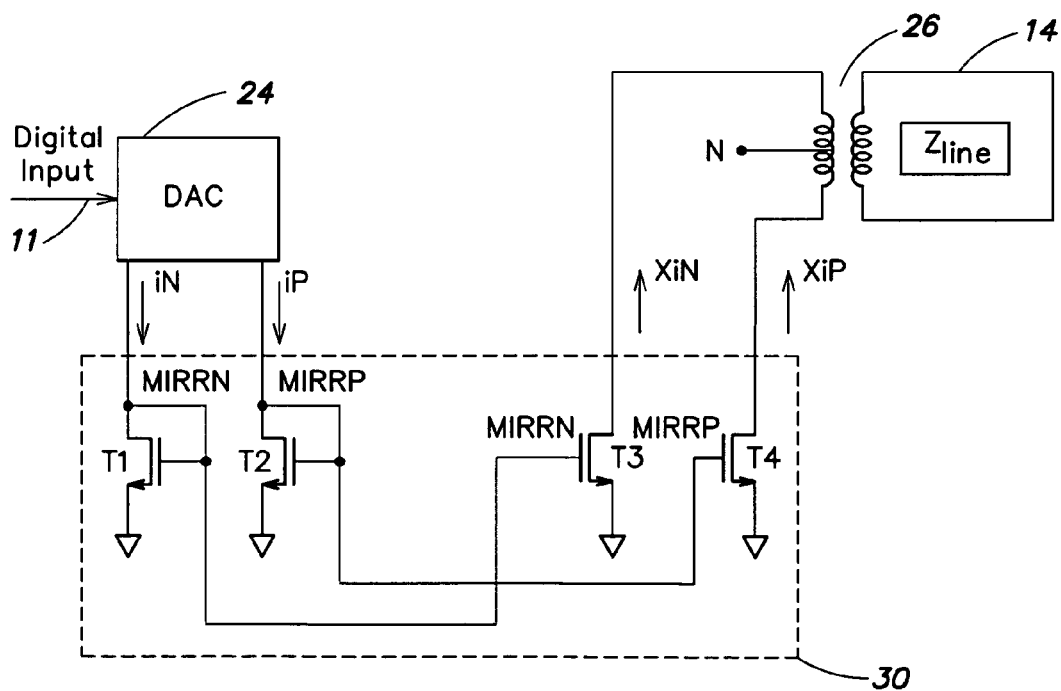
FIG. 4 is a more detailed partial block, partial schematic diagram of another embodiment of the transmit driver of the present invention.

FIG. 4 is a partial block, partial schematic diagram illustrating another embodiment of the transmit driver of the present invention. This embodiment illustrates a second current output mode of operation of the transmit driver of the present invention. In this embodiment, included are four NMOS transistors T1 through T4. Transistors T1-T4 combine to form differential current mirror 30. In this embodiment, the differential output currents iN and iP of DAC 24 flow through transistors T1 and T2, respectively. Current mirror 30 then reproduces those currents iN and iP, which in turn flow through transformer 26 and drive line 14. Current mirror 30 can add gain X to the currents iN and iP and thus are shown as XiN and XiP. Such gain X in current mirror 30 is programmable.

In FIG. 3, the DAC is a PMOS DAC and the current mirror is an NMOS current mirror but the invention is not so limited. It could be an NMOS DAC in combination with a PMOS current mirror or it could be implemented in a different technology such as bipolar or bi-CMOS. By definition, PMOS DAC sources current going towards ground and an NMOS DAC sinks current from a positive supply voltage.

A center tap of transformer 26 is connected to node N which is a supply node. In one embodiment, the supply voltage connected to node N is 5 volts. The mirroring allows 5 volt-like operation even if the DAC is implemented in a 3 volt technology as long as the mirror transistors can support 5 volts. This second mode of operation of the transmit driver of the invention has increased power capabilities due to the programmable gain provided by mirror 30, but could have somewhat degraded performance as compared to the current mode operation shown in FIG. 3. The embodiment of FIG. 4 may be used in an application where voltage swings in the line are somewhat greater than that possible to achieve by driving the line directly from the DAC outputs.

In an application where the impedance of the load varies greatly, such as that of a power line, the line driver of the present invention is configurable to a voltage mode of operation. Such a voltage mode of operation is preferable where the impedance of the line varies greatly. In voltage mode of operation, the driver output impedance is low and so the output voltage of the driver stays relatively constant even if the load impedance varies. In current mode of operation, the driver output voltage increases with increasing load impedance and may eventually slip.

Figure 5:
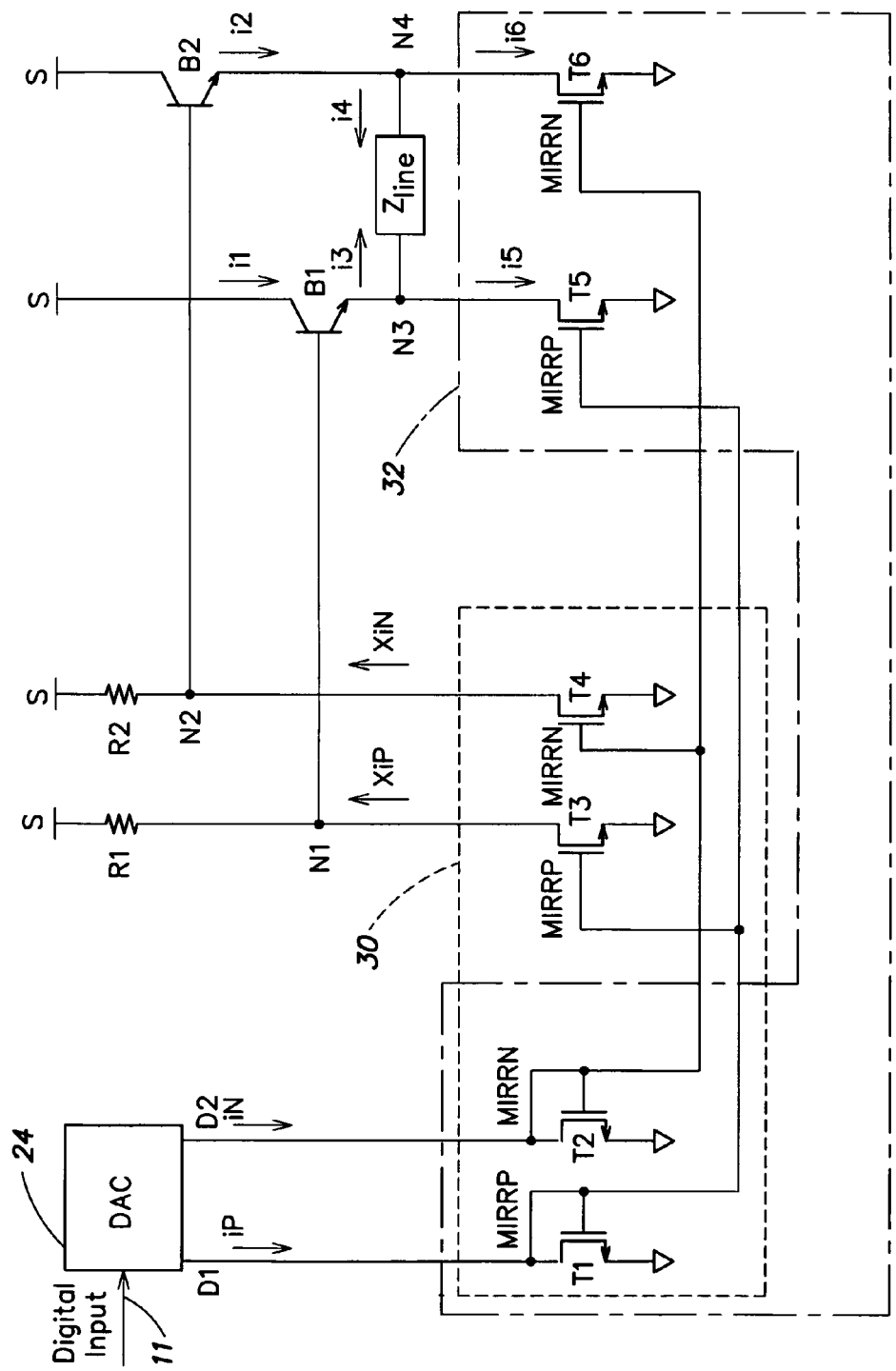
FIG. 5 is a more detailed partial block, partial schematic diagram of another embodiment of the transmit driver of the present invention; and Each of FIGS. 6a and 6b is a more detailed partial block, partial schematic diagram of another embodiment of the transmit driver of the present invention.

FIG. 5 is a partial block, partial schematic diagram illustrating the configuration of the transmit driver of the present in its voltage mode of operation. As shown, the driver includes DAC 24, first set of transistors T1 and T2, second set of transistors T3 and T4, third set of transistors T5 and T6, resistors R1 and R2, and bipolar junction transistors (BJTs) B1 and B2. T1, T2, T3 and T4 comprise first current mirror 30, and transistors T1, T2, T5 and T6 comprise second current mirror 32. Each of the BJTs B1 and B2 is connected in an emitter-follower configuration. An emitter-follower configured BJT can have very low output impedance, e.g., 2-3 ohms. Resistor R1 is connected between supply S and resistor T3. Resistor R2 is connected between supply S and transistor T4. BJT B1 is connected between supply S and transistor T5 and receives its input voltage from node N1, located between resistor R1 and transistor T3. BJT B2 is connected between supply S and transistor T6 and receives its input voltage from node N2, connected between resistor R2 and transistor T4. As in previous figures, the line is modeled by impedance $Z_{line}$, which could be the characteristic impedance of the line.

In an embodiment of the invention, supply S equals 5 volts, but the invention is not so limited. Supply S could be of any other value.

In operation, DAC 24 receives digital input on line 11 and provides outputs iN and iP flowing through transistors T1 and T2. Current mirror 30 mirrors current iN and iP (with or without gain) and provides such currents to flow through resistors R1 and R2 to supply S. The current flowing through resistors R1 and R2 is used to generate the voltages at nodes N1 and N2 which drive BJTs B1 and B2, respectively, each connected in an emitter-follower configuration. Second current mirror 32, consisting of transistors T5 and T6, also mirrors currents iN and iP (with or without gain) and provides such currents to flow through BJTs B1 and B2.

As stated, a BJT connected as an emitter follower has a low output impedance. Nominally, with no current flowing through the load, equal current flows through both BJTs B1 and B2, and this current is called the quiescent current. This is when the driver is in the quiescent state. All transistor currents are equal in this state. When the digital input to the DAC changes, unequal current flows through the transistors causing current to flow into the load $Z_{line}$. It should be appreciated that current mirrors 30 and 32 work similarly.

The base-emitter junction of each BJT has a voltage of approximately 0.7 volts across it. It should be noted that this voltage changes nonlinearly with load current, causing distortion in the output voltage. For illustrative purposes, as will be described in connection with examples listed below, current flowing through BJT B1 is listed as i1, current flowing through transistor T5 is listed as i5, current flowing through BJT transistor B2 is listed as i2, current flowing through transistor T6 is listed as i6, current flowing in one direction (as illustrated by the arrow) through $Z_{line}$ is illustrated as current i3, and current flowing in the opposite direction (as illustrated by the arrow) through $Z_{line}$ is illustrated as current i4.

Consider the following examples with reference to FIG. 5:

EXAMPLE 1

Nominally, while in quiescent state, i1=i2=i5=i6=30 mA and i3=i4=0 amps. Then, in a max condition a.c. state, with current flowing through load $Z_{line}$, i1=i2=i3=30 mA, i6=60 mA, and i4=i5=0 amps. Thus, current flowing through load $Z_{line}$=i3 is 30 mA.

EXAMPLE 2

In the nominal state, i1=i2=i5=i6=60 mA and i3=i4=0 amps. Then, in the max condition a.c. state, with current flowing through load $Z_{line}$, i1=i2=60 mA, i3=60 mA, i4=i5=0 mA and i6=120 mA.

Note that in Example 2, even though the load current is the same as that of Example 1, the quiescent currents are a lot higher. But currents flowing through B1 and B2 in Example 2, however, remain constant, resulting in lower distortion. Thus this invention allows power to be traded off with distortion in a programmable manner since the current mirror gains are programmable.

In the embodiment shown in FIG. 5, mirrors 30 and 32 are connected in parallel, but this does not give optimal performance so far as distortion is concerned. The first current mirror pair 30 must be very accurate but not so for the second current mirror pair 32 because the first affects the performance to a much greater extent. Thus, an alternate embodiment is to decouple mirror 30 from mirror 32. This is done with additional mirroring as illustrated in FIG. 5. By decoupling mirror 30 from mirror 32 using additional current mirrors, accuracy is improved.

Figure 6A:
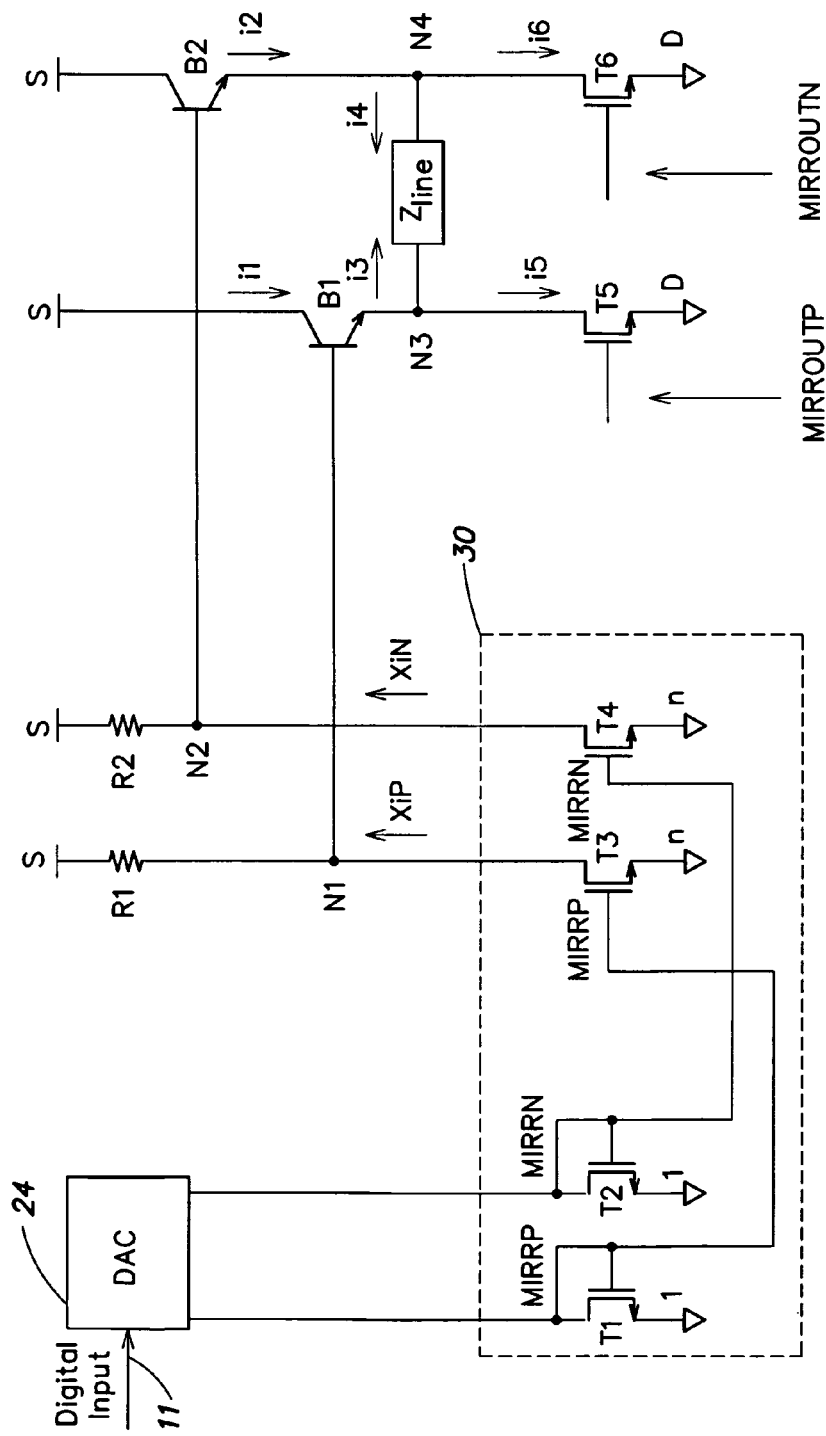
Figure 6B:
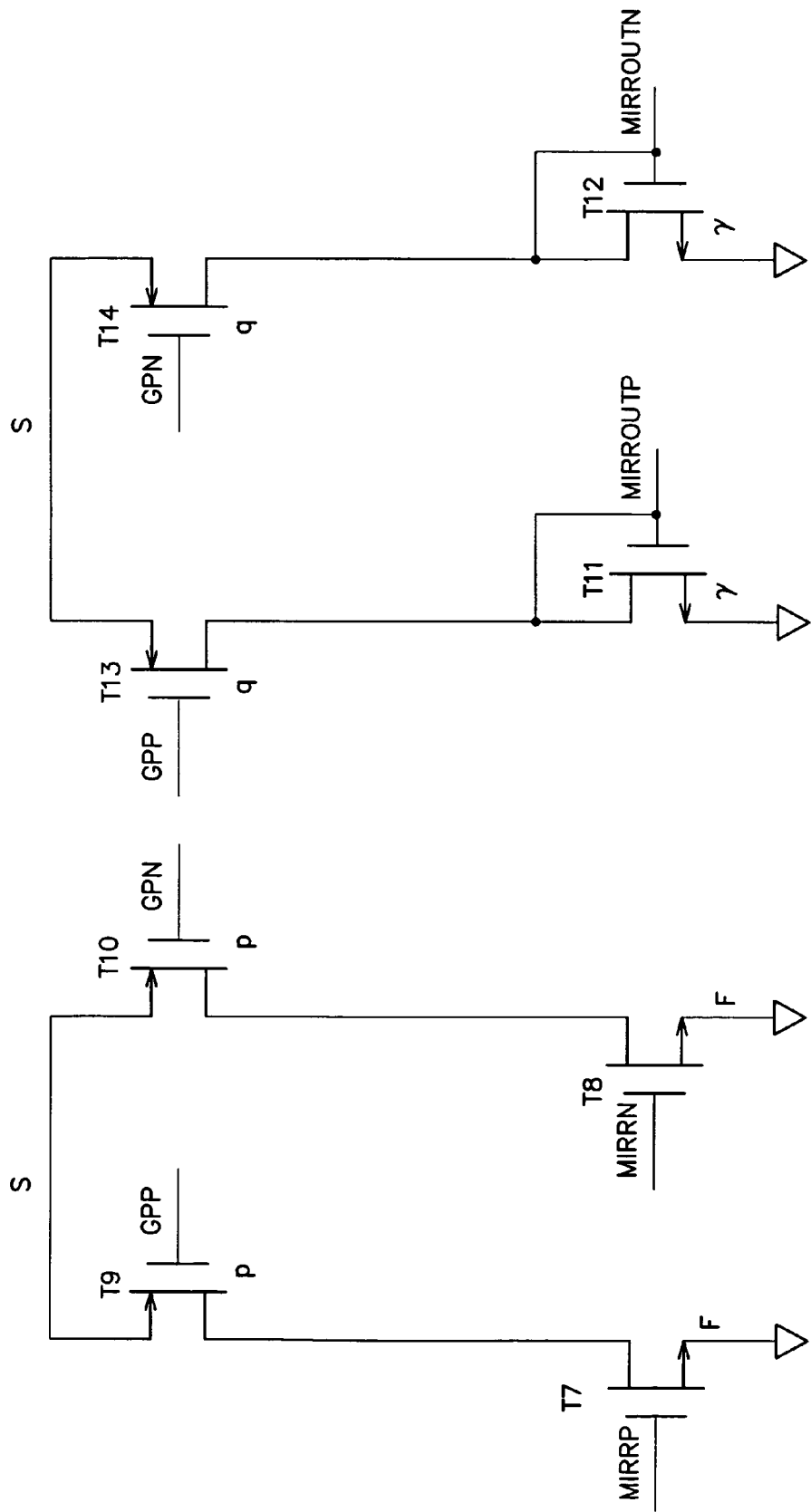

The additional mirroring can be implemented as shown in FIGS. 6a and 6b. FIG. 6b includes additional transistors T7-t14. MIRRP and MIRRN nodes come off the main mirror in FIG. 6a, but the ratio 1:F is chosen to be small so that devices T7 and T8 do not load the main mirror excessively and thereby degrade its performance. The high mirror ratio required to deliver power to the load is implemented by the PMOS current mirror consisting of devices T9, T10, T13, T14 and the NMOS current mirror consisting of devices T11, T12, T5 and T6. The effective mirror ratio of this "secondary" current mirror is (F×q/p×D/γ):1 as is evident from FIGS. 6a and 6b. Also, even though the description has used CMOS transistors, the above ideas are by no means restricted to CMOS technology. It could be implemented in bipolar, bi-CMOS, or any other technology, including non-monolithic technology.

Additionally, the driver can be placed in a high impedance by starving current mirrors.

If implemented in a bi-CMOS or a bi-polar process, the BJT transistors could be implemented on chip. One embodiment of the invention, however, is to include both BJT transistors B1 and B2 and both resistors R1 and R2 off-chip. In FIG. 5, nodes D1, D2, N1, N2, N3, N4 could be pins of the integrated circuit. The driver could be configured by any one of the following: (a) connecting the outputs of the DAC D1, D2 directly to the line; (b) connecting nodes N1, N2 to the line; (c) connecting nodes N3, N4 to the line; (d) shorting N1, N3 and N2, N4 respectively and connecting them to the line; or (e) in the voltage mode by connecting the BJTs as shown in FIG. 5.

The driver is reconfigurable from operation in current mode (a, b, c, d above) or operation in voltage mode (e above). Full-scale current can be varied. The gain of each current mirror is programmable as is the quiescent current of the driver.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A transmit line driver adapted to drive a signal over a transmit line, the transmit line driver comprising:
   a digital-to-analog converter (DAC) receiving a digital input and providing at least one analog current output; and
   conversion circuitry adapted for coupling between the DAC and a transformer of the transmit line, the conversion circuitry adapted to convert the analog current output to a signal to be transmitted over the transmit line via the transformer, wherein the conversion circuitry is reconfigurable such that the transmit driver is capable of operating in at least one current mode and at least one voltage mode depending on at least one characteristic of the transmit line,
   wherein the at least one current mode includes a first current mode, wherein when the transmit driver is operating in the first current mode, the conversion circuitry is configured to directly connect the at least one analog current output provided by the DAC to the transformer.

2. The transmit line driver of claim 1, wherein the at least one current mode includes a second current mode and the at least one analog current output includes a first current output and a second current output, and wherein the conversion circuitry comprises a first current mirror and a second current mirror, and wherein when the transmit driver is operating in the second current mode, the conversion circuitry is configured to connect the first current output provided by the DAC as an input to the first current mirror and the second current output provided by the DAC as an input to the second current mirror, and to connect an output of the first current mirror and an output of the second current mirror to the transformer.

3. The transmit line driver of claim 2, wherein the first current mirror and the second current mirror provide a programmable gain to the first current output and the second current output, respectively.

4. The transmit line driver of claim 1, wherein the at least one current mode includes a second current mode, and wherein the conversion circuitry comprises at least one current mirror coupled between the DAC and the transformer, and wherein when the transmit line driver is operating in the second current mode, the conversion circuitry is configured to connect the at least one analog current output provide by the DAC to the at least one current mirror.

5. The transmit line driver of claim 4, wherein the at least one current mirror adds gain to the at least one current output of the DAC.

6. The transmit line driver of claim 5, wherein the gain of the at least one current mirror is programmable.

7. The transmit line driver of claim 4, wherein the at least one current mirror comprises a first transistor and a second transistor adapted to be connected between the DAC and the transformer of the transmit line.

8. The transmit line driver of claim 2, wherein the first current mirror comprises a first transistor and a second transistor and the second current mirror comprises a third transistor and a fourth transistor.

9. A transmit line driver adapted to drive a signal over a transmit line, the transmit line driver comprising:
   a digital-to-analog converter (DAC) receiving a digital input and providing at least one analog current output; and
   conversion circuitry adapted for coupling between the DAC and a transformer of the transmit line, the conversion circuitry adapted to convert the analog current output to a signal to be transmitted over the transmit line via the transformer, wherein the conversion circuitry is reconfigurable such that the transmit driver is capable of operating in at least one current mode and at least one voltage mode depending on at least one characteristic of the transmit line,
   wherein the conversion circuit comprises first and second current mirrors, first and second resistors, first and second bipolar transistors, coupled between the DAC and the transformer, and wherein when the line driver operates in the at least one voltage mode, the conversion circuit connects at least one of the first and second bipolar transistors to the transformer.

10. The transmit line driver of claim 1, wherein the at least one characteristic of the transmit line includes at least one impedance of the transmit line.

11. The transmit line driver of claim 1, wherein the at least one characteristic of the transmit line includes at least one impedance of the transmit line, and wherein the transmit line driver is configured to operate in the first current mode when an impedance of the transmit line is relatively stable.

12. The transmit line driver of claim 11, wherein the transmit line is a cable modem transmit line.

13. The transmit line driver of claim 4, wherein the transmit line driver is configured to operate in the second current mode in circumstances wherein voltage swings in the transmit line are greater than achievable by driving the transmit line in the first current mode.

14. The transmit line driver of claim 13, wherein the at least one characteristic of the transmit line includes at least one impedance of the transmit line, and wherein the transmit line driver is configured to operate in the at least one voltage mode when an impedance of the transmit line varies more than can be accommodated in either the first current mode or the second current mode.

15. The transmit line driver of the claim 13, wherein the transmit line driver is configured to operate in the at least one voltage mode when the transmit line includes a power line.

* * * * *